(12) United States Patent
An et al.

(10) Patent No.: US 12,030,579 B2
(45) Date of Patent: Jul. 9, 2024

(54) PERSONAL MOBILITY AND CONTROL METHOD THEREOF

(71) Applicants: HYUNDAI MOTOR COMPANY, Seoul (KR); KIA CORPORATION, Seoul (KR)

(72) Inventors: Rowoon An, Seoul (KR); Ilsun Song, Seongnam-si (KR); Jae Yul Woo, Seoul (KR); Seunghyun Woo, Seoul (KR); Soobin Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 356 days.

(21) Appl. No.: 17/412,735

(22) Filed: Aug. 26, 2021

(65) Prior Publication Data

US 2022/0135172 A1 May 5, 2022

(30) Foreign Application Priority Data

Nov. 5, 2020 (KR) .................. 10-2020-0146776

(51) Int. Cl.
| | |
|---|---|
| B62K 11/02 | (2006.01) |
| B62J 1/00 | (2006.01) |
| B62J 9/10 | (2020.01) |
| B62J 45/20 | (2020.01) |
| B62J 45/41 | (2020.01) |
| B62J 50/21 | (2020.01) |
| B62K 17/00 | (2006.01) |
| B62J 43/16 | (2020.01) |

(52) U.S. Cl.
CPC ............. *B62K 11/02* (2013.01); *B62J 1/00* (2013.01); *B62J 9/10* (2020.02); *B62J 45/20* (2020.02); *B62J 45/41* (2020.02); *B62J 50/21* (2020.02); *B62K 17/00* (2013.01); *B62J 43/16* (2020.02)

(58) Field of Classification Search
CPC .. B62K 11/02; B62K 17/00; B62J 1/00; B62J 9/10; B62J 45/20; B62J 45/41; B62J 50/21
See application file for complete search history.

(56) References Cited

U.S. PATENT DOCUMENTS

| | | | | |
|---|---|---|---|---|
| 5,941,327 A | * | 8/1999 | Wu | B62K 5/007 180/311 |
| 6,336,517 B1 | * | 1/2002 | Cheng | B62K 5/007 403/321 |
| 7,044,249 B2 | * | 5/2006 | Fan | B62D 21/12 280/278 |
| 7,950,686 B2 | * | 5/2011 | Wang | B62K 5/007 280/491.4 |
| 8,540,272 B1 | * | 9/2013 | Vitale | B62D 47/003 280/638 |

* cited by examiner

*Primary Examiner* — Jason D Shanske
*Assistant Examiner* — James J Triggs
(74) *Attorney, Agent, or Firm* — MCDONNELL BOEHNEN HULBERT & BERGHOFF LLP (57) ABSTRACT

Disclosed are a personal mobility and a control method thereof. The personal mobility includes a front body on which a front wheel is installed, and a rear body slidably coupled to the front body in a front-rear direction to enable wheelbase adjustment and on which a rear wheel is installed.

4 Claims, 11 Drawing Sheets

PERSONAL MOBILITY AND CONTROL METHOD THEREOF

CROSS REFERENCE TO RELATED APPLICATIONS

This application is based on and claims priority under 35 U.S.C. § 119 to Korean Patent Application No. 10-2020-0146776, filed on Nov. 5, 2020, in the Korean Intellectual Property Office, the disclosure of which is incorporated by reference herein in its entirety.

BACKGROUND

1. Field

The disclosure relates to a personal mobility capable of adjusting a wheelbase according to the number of passengers and a control method thereof.

2. Description of the Related Art

Recently, a sharing service using a personal mobility, such as an electric bicycle and an electric scooter, has been developed. When a destination is too close to move by a vehicle but too far to walk, a user may move easily by using an electric bicycle or the like.

However, because a typical personal mobility is designed for one person, the typical personal mobility may be difficult to use when the number of passengers increases by more than 2 persons, or when there is cargo to be transported.

SUMMARY

It is an aspect of the disclosure to provide a personal mobility capable of adjusting a wheelbase in response to a change in the number of passengers or the amount of cargo and a control method thereof.

Additional aspects of the disclosure will be set forth in part in the description which follows and, in part, will be obvious from the description, or may be learned by practice of the disclosure.

In accordance with an aspect of the disclosure, a personal mobility includes a front body comprising a front wheel, and a rear body slidably coupled to the front body in a front-rear direction to enable wheelbase adjustment, the rear body comprising a rear wheel.

The personal mobility may further include a sliding connection unit configured to connect the front body and the rear body, an extension/contraction drive unit configured to move the rear body in the front-rear direction to adjust a wheelbase, and a locking device configured to lock or unlock the sliding connection unit.

The sliding connection unit may include an upper extension part extending forward from an upper side of the rear body and slidably coupled to an upper support rail of the front body, and a lower extension part extending forward from a lower side of the rear body and slidably coupled to a lower support rail of the front body.

The extension/contraction drive unit may include a rack gear mounted on the upper extension part to extend in a longitudinal direction of the upper extension part, a pinion gear engaged with the rack gear, and a driving motor fixed to the front body to rotate the pinion gear in a forward direction and a reverse direction.

The locking device may include a plurality of locking holes provided on the upper extension part and disposed to be spaced apart from each other in a longitudinal direction of the upper extension part, a locking pin capable of locking the upper extension part by entering one of the plurality of locking holes, and an actuator configured to advance or retreat the locking pin in a locking or unlocking direction.

The personal mobility may further include a seat provided above the upper extension part to extend in the front-rear direction, a cargo loading space provided between the upper extension part and the lower extension part, and a load sensor installed on the rear body to detect the weight of cargo and a passenger.

The personal mobility may further include a plurality of user access sensors configured to detect the number of users accessing the personal mobility, a boarding sensor installed on the rear body to detect whether or not a passenger boards and a separation distance between the passenger's back and a rear upper side of the rear body, and a controller configured to control the operation of the extension/contraction drive unit and the locking device based on the detection information of the user access sensor or the boarding sensor.

In accordance with an aspect of the disclosure, a control method of a personal mobility, which includes a front body and a rear body connected to enable wheelbase adjustment by a sliding connection unit and an extension/contraction drive unit to move the rear body in a front-rear direction to adjust a wheelbase, includes recognizing the number of users based on detection of one or more user access sensors or information input by a user and then determining whether the number of users exceeds an initial setting, and extending the wheelbase via the extension/contraction drive unit when the number of users exceeds the initial setting and maintain the wheelbase in an initial state when the number of users does not exceed the initial setting.

The control method may further include determining whether the user has boarded based on detection information of a boarding sensor provided on a rear upper side of the rear body after controlling the operation of the extension/contraction drive unit, determining whether the adjusted wheelbase is appropriate by calculating a separation distance between a passenger's back and the boarding sensor when it is determined that the user has boarded, and re-adjusting the wheelbase via the extension/contraction drive unit when it is determined that the wheelbase is not appropriate.

The control method may further include determining whether a load is appropriate by detecting the weight of cargo and the passenger with a load sensor after the user boards, and warning of an excess of load through an alarm when it is determined that the load is not appropriate.

The control method may further include controlling the locking device to lock the sliding locking unit when driving starts, and controlling the operation of the extension/contraction drive unit and the locking device to initialize the wheelbase when the driving is finished.

In accordance with an aspect of the disclosure, a control method of a personal mobility, which includes a front body and a rear body connected to enable wheelbase adjustment by a sliding connection unit and an extension/contraction drive unit to move the rear body in a front-rear direction to adjust a wheelbase, includes determining whether power is ON, adjusting the wheelbase via the extension/contraction drive unit to a single-person boarding condition when it is determined that the power is ON, determining whether a manual adjustment signal for the wheelbase adjustment has been generated after the wheelbase is adjusted to the single-person boarding condition, and adjusting the wheelbase via the extension/contraction drive unit in response to the manual adjustment signal when it is determined that the manual adjustment signal has been generated, and maintaining the wheelbase in the single-person boarding condition when it is determined that the manual adjustment signal has not been generated.

In accordance with an aspect of the disclosure, a control method of a personal mobility, which includes a front body and a rear body connected to enable wheelbase adjustment by a sliding connection unit and an extension/contraction drive unit to move the rear body in a front-rear direction to adjust a wheelbase, includes determining whether power is ON, determining whether one or more users are detected by the one or more user access sensors when it is determined that the power is ON, and extending the wheelbase to the maximum via the extension/contraction drive unit when it is determined that the one or more users are detected.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
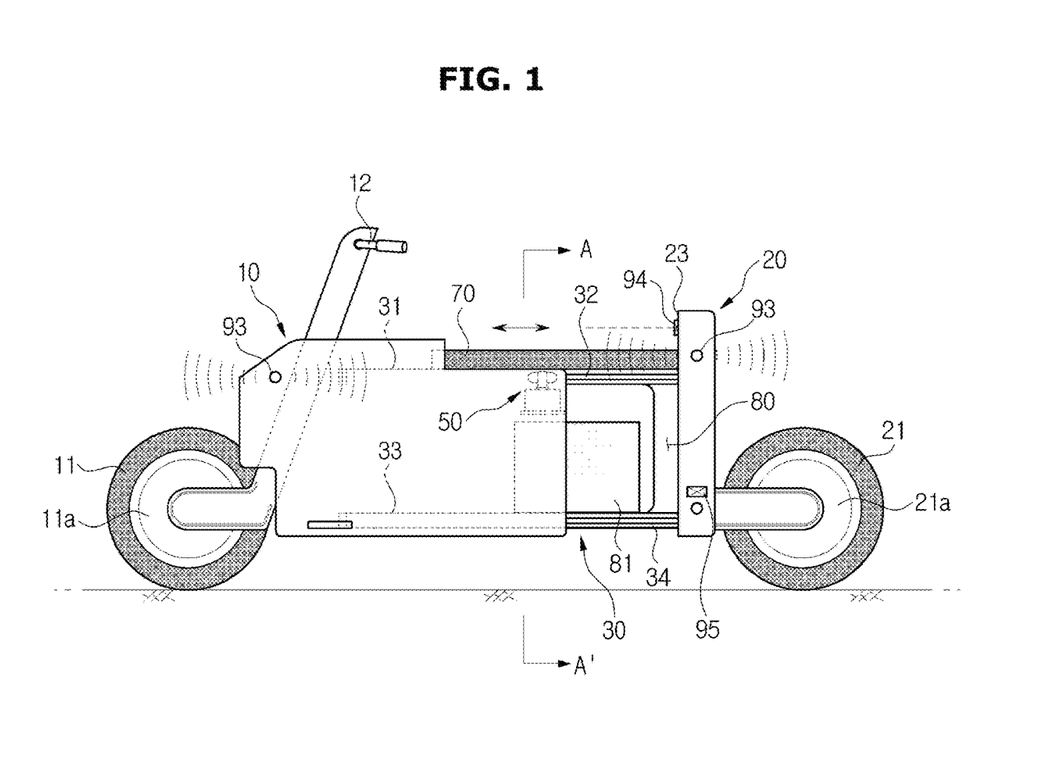
FIG. 1 a side view of a personal mobility according to an embodiment of the disclosure.
Figure 2:
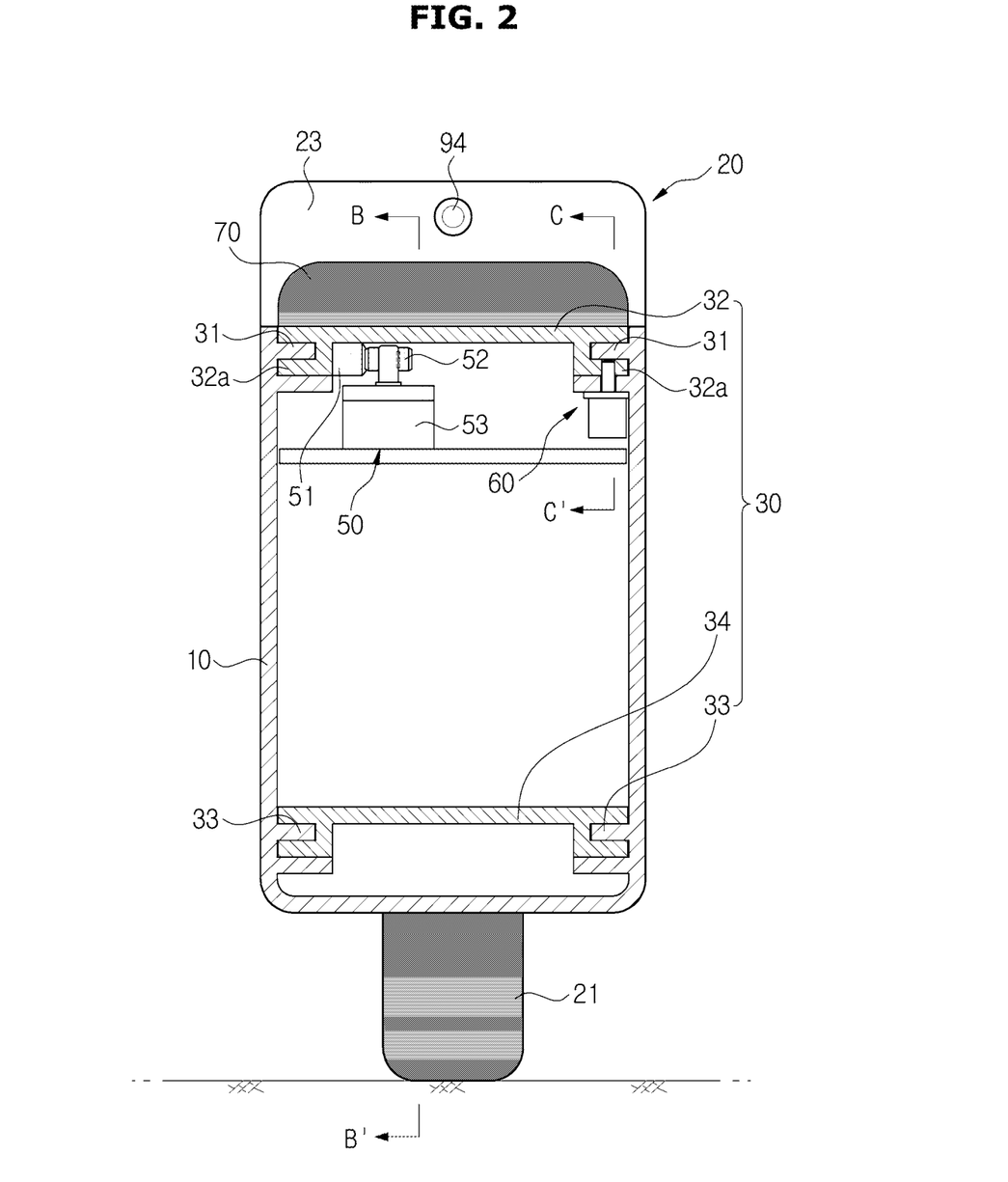
FIG. 2 is a cross-sectional view taken along line A-A' in FIG. 1.

Referring to FIGS. 1 and 2, a personal mobility according to an embodiment of the disclosure may include a front body 10 on which a front wheel 11 and a steering wheel 12 are installed, a rear body 20 slidably coupled to a rear end of the front body 10 and on which a rear wheel 21 is installed, a sliding connection unit 30 to connect the front body 10 and the rear body 20, a drive unit, which may be an extension/contraction drive unit 50, to move the rear body 20 forward and backward for adjustment of a wheelbase, and a locking device 60 to lock or release the sliding connection unit 30.

At least one of the front wheel 11 and the rear wheel 12 may be provided with a wheel driving motor 11a or 21a for driving, and a battery (not shown) to provide energy to the wheel driving motor 11a or 21a may be installed on the at least one of the front body 10 and the rear body 20.

In the personal mobility of the present embodiment, because the front body 10 and the rear body 20 are connected by the sliding connection unit 30, the rear body 20 may be moved forward and backward to adjust the wheelbase. For example, when one person boards, the wheelbase may be adjusted to be relatively shortened by moving the rear body 20 forward, and when two persons board, the wheelbase may be adjusted to be relatively lengthened by moving the rear body 20 backward.

Figure 3:
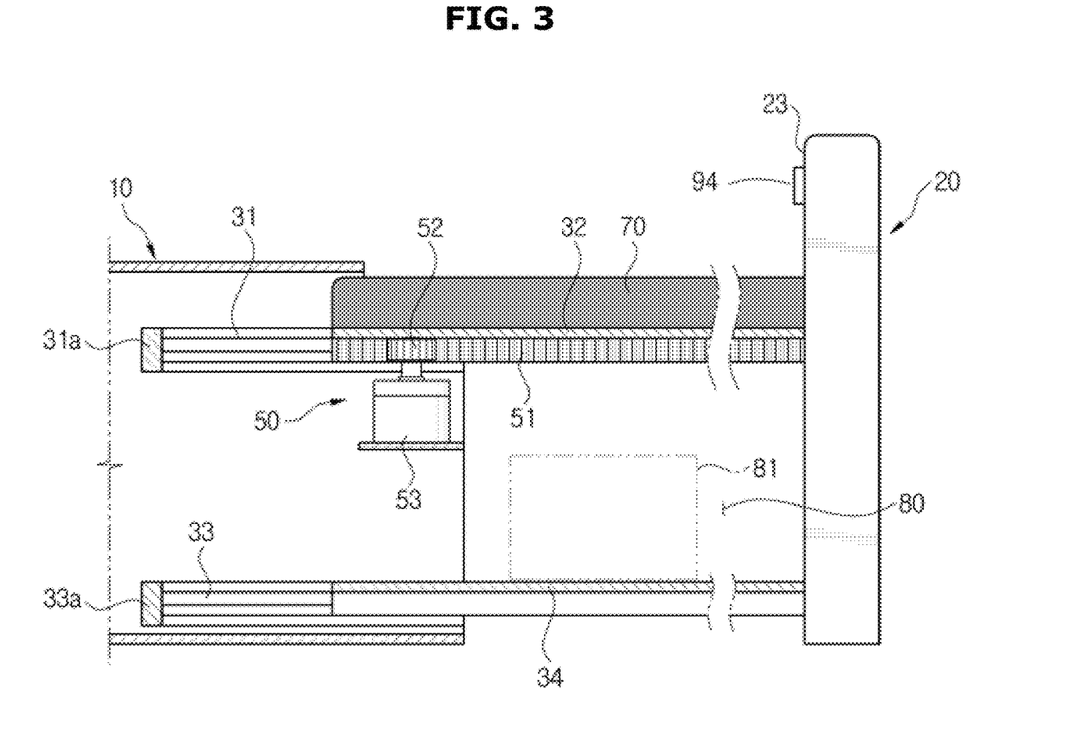
FIG. 3 is a cross-sectional view taken along line B-B' in FIG. 2.

Referring to FIGS. 2 and 3, the sliding connection unit 30 may include upper support rails 31 provided on opposite upper sides of the front body 10, respectively, and extending in a front-rear direction, an upper extension part 32 extending forward from the upper side of the rear body 20 and slidably coupled to the upper support rails 31 on opposite sides thereof, lower support rails 33 provided on opposite lower sides of the front body 10, respectively, and extending in the front-rear direction, and a lower extension part 34 extending forward from the lower side of the rear body 20 and slidably coupled to the lower support rails 33 on opposite sides thereof.

The upper extension part 32 may be provided in a flat plate shape, and includes rails 32a provided on the opposite sides to be coupled to correspond to the upper support rails 31. The lower extension part 34 may be provided at a lower portion spaced apart from the upper extension part 32 in a form equivalent to the upper extension part 32. Buffer stoppers 31a and 33a to limit the entry of the upper extension part 32 and the lower extension part 34 and buffer the impact caused by the entry may be installed at front ends of the upper support rails 31 and the lower support rails 33 inside the front body 10.

A seat 70 on which a plurality of users may board may be provided on a upper portion of the upper extension part 32, and a cargo loading space 80 may be provided between the upper extension part 32 and the lower extension part 34. The seat 70 may extend long in the front-rear direction to cover an upper surface of the upper extension part 32.

A front end of the seat 70 may enter the inside of the front body 10 together with the upper extension part 32. Accordingly, a length of the seat 70 to be exposed may be lengthened or shortened depending on the adjustment of the wheelbase. The rear body 20 may include a backrest part 23 extend more upward than a height of the seat 70.

A cargo 81 may be loaded in the cargo loading space 80 above the lower extension part 34. When an amount of cargo 81 is large, the cargo loading space 80 may be increased by adjusting the wheelbase to be lengthened, and when the amount of cargo 81 is small, the cargo loading space 80 may be decreased by adjusting the wheelbase to be shortened.

The extension/contraction drive unit 50 may include a rack gear 51 mounted on a lower surface of the upper extension part 32 to extend long in a longitudinal direction of the upper extension part 32, a pinion gear 52 positioned at an inner side of the from body 10 and engaged with the rack gear 51, and a driving motor 53 fixed to the inner side of the front body 10 to rotate the pinion gear 52 in forward and reverse directions.

The extension/contraction drive unit 50 may rotate the pinion gear 52 by an operation of the driving motor 53 to move the rack gear 51 in the front-rear direction. Therefore, the rear body 20 may be moved forward or rearward to lengthen or shorten the wheelbase.

As the driving motor 53 of the extension/contraction drive unit 50, an encoder motor, a step motor, a servo motor, or the like, which may implement an exact movement of the rear body 20 through precise rotation angle control, may be used. The driving motor 53 may include a reduction device to rotate the pinion gear 52 with a large force.

Figure 4:
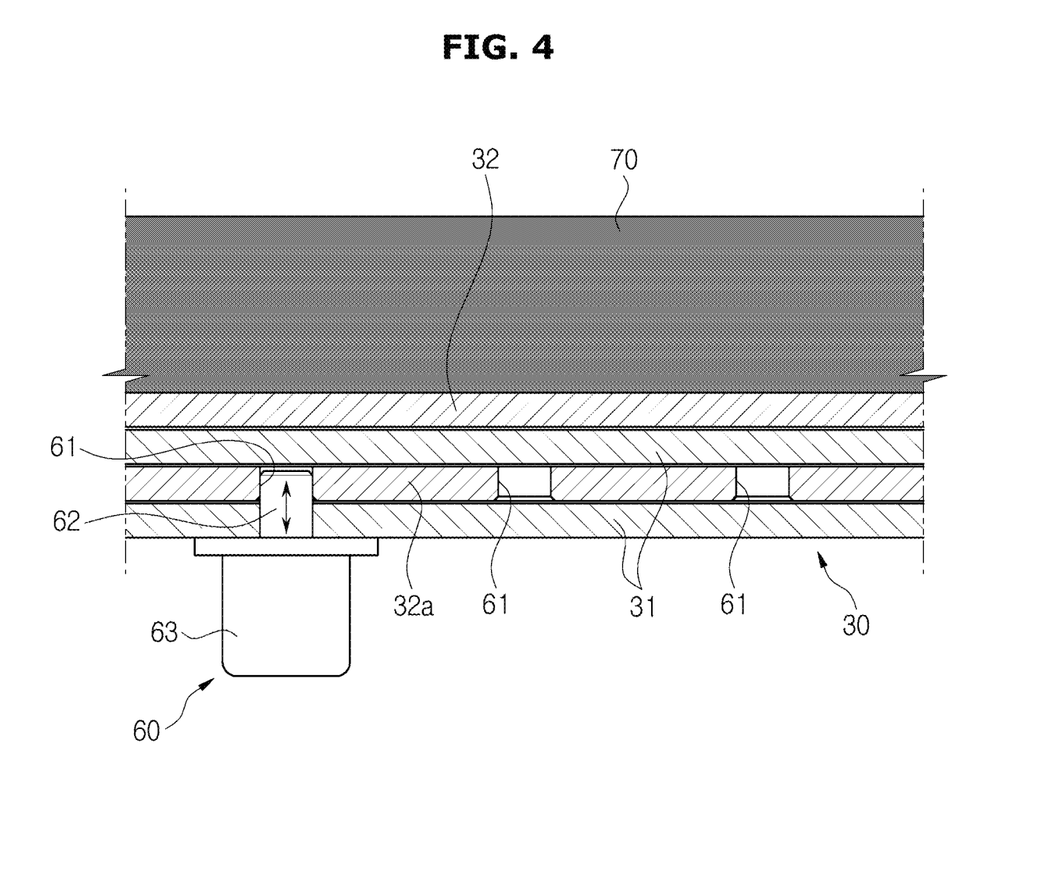
FIG. 4 is a cross-sectional view taken along line C-C' in FIG. 2, which illustrates a state in which a locking device locks a sliding connection unit.
Figure 5:
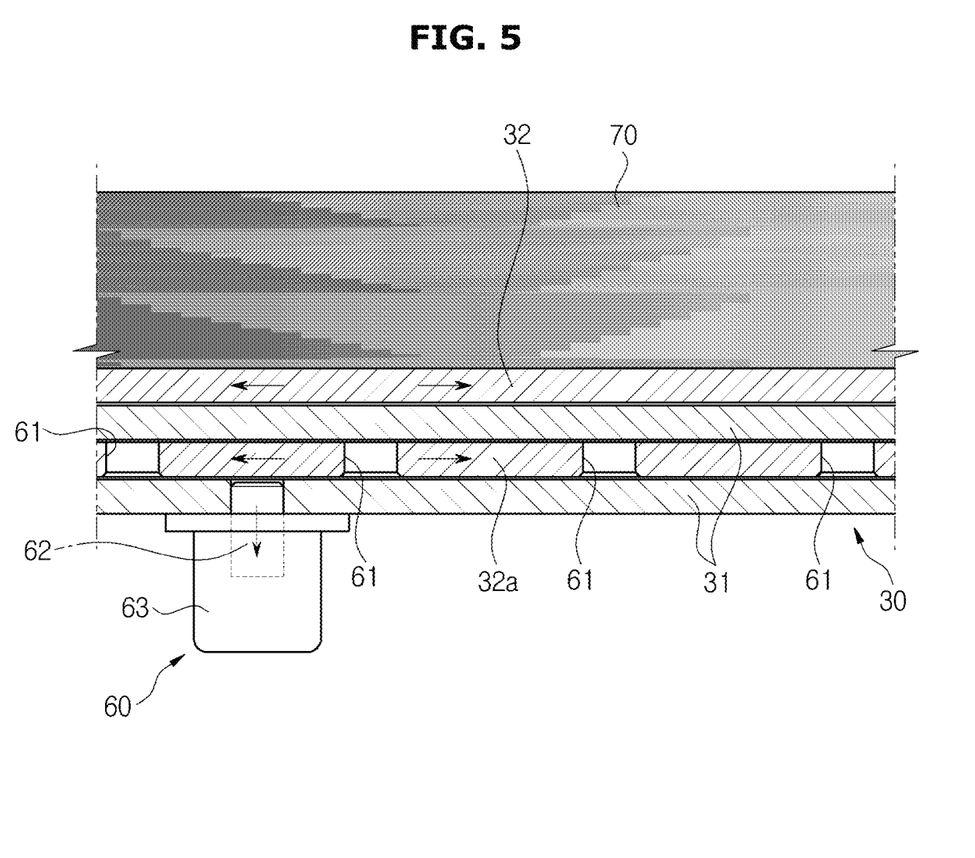
FIG. 5 is a cross-sectional view taken along line C-C' in FIG. 2, which illustrates a state in which the locking device releases locking of the sliding connection unit.

Referring to FIGS. 2, 4, and 5, the locking device 60 may include a plurality of locking holes 61 provided on the rail 32a of the upper extension part 32 and disposed to be spaced apart from each other in the longitudinal direction of the upper extension part 32, a locking pin 62 capable of locking the upper extension part 32 by entering one of the plurality of locking holes 61, and an actuator 63 installed on the upper support rail 31 to advance or retreat the locking pin 62 in a locking or unlocking direction.

The locking device 60 may lock the sliding connection unit 30 by raising the locking pin 62 to enter the locking pin 62 into the locking hole 61 as illustrated in FIG. 4, and may release locking of the sliding connection unit 30 by lowering the locking pin 62 to separate the locking pin 62 from the locking hole 61 as illustrated in FIG. 5.

The locking device 60 may release locking of the sliding connection unit 30 when the extension/contraction drive unit 50 operates to adjust the wheelbase, and may lock the sliding connection unit 30 when the extension/contraction drive unit 50 stops operating after adjusting the wheelbase. The operation of the extension/contraction drive unit 50 may be controlled by a program set such that one of the locking holes 61 may be accurately stopped at the position of the locking pin 62 in the process of adjusting the wheelbase.

Figure 8:
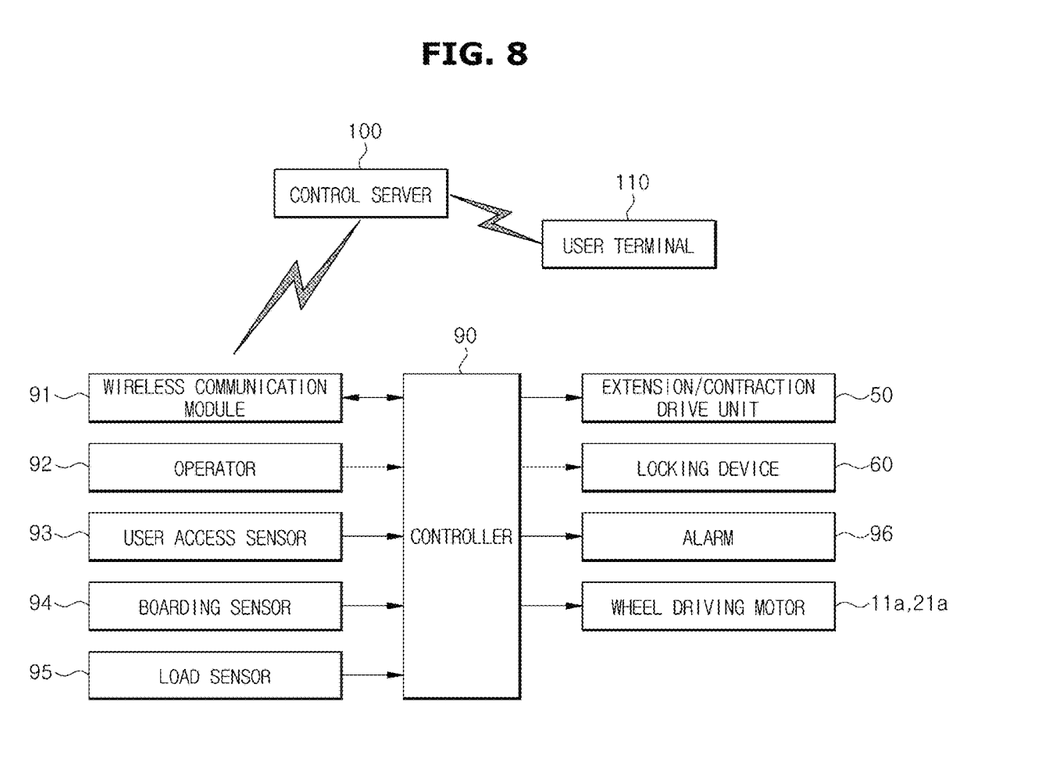
FIG. 8 is a control block diagram of the personal mobility according to an embodiment of the disclosure.

Referring to FIG. 8, the personal mobility of the present embodiment may include a wireless communication module 91, an operator 92, a plurality of user access sensors 93, a boarding sensor 94, a load sensor 95, an alarm 96, and a controller 90.

The wireless communication module 91 may communicate with a control server 100 through a wireless network. The wireless communication module 91 may transmit information transmitted from the control server 100 to the controller 90 or may transmit information from the controller 90 to the control server 100.

A user who intends to rent and use a personal mobility may request user authentication from the control server 100 through a user terminal 110, and the control server 100 may transmit information on whether to use authentication or not to the controller 90 of the corresponding personal mobility in consideration of member information, payment information, and the like.

The user may input information on the number of passengers in the user terminal 110 in advance and transmit the information, and the controller 90 of the personal mobility may control the operation of the extension/contraction drive unit 50 and the locking device 60 to adjust the wheelbase based on the transmitted information on the number of passengers. The user terminal 110 may be a smart phone provided with a service app (APP) or various portable terminals capable of wireless communication.

The operator 92 may be provided on the steering wheel 12 or the like and may transmit information inputted by user manipulation to the controller 90. The user may manipulate operator 91 to control the overall operation of the personal mobility. Accordingly, the user may directly input information related to the wheelbase adjustment as well as information related to driving of the personal mobility through the operator 92.

The plurality of user access sensors 93 may be installed on the front body 10 and the rear body 20 and may detect the number of users accessing the personal mobility. The user access sensors 93 may be configured as ultrasonic sensors. The controller 90 may recognize the number of users based on the detection of the plurality of user access sensors 93 and may control the operation of the extension/contraction drive unit 50 and the locking device 60 to adjust the wheelbase to be lengthened or shortened based on the number of users.

As illustrated in FIGS. 1 and 3, the boarding sensor 94 may be installed on the upper backrest part 23 of the rear body 20. The boarding sensor 94 may detect whether the user is boarding and a separation distance between the passenger's back and the boarding sensor 94. The boarding sensor 94 may be configured as a laser sensor.

The controller 90 may determine whether the user has boarded based on the detection of the boarding sensor 94 and may determine whether the wheelbase is properly adjusted based on a separation distance between the passenger's back and the backrest part 23. The controller 90 may control the operation of the extension/contraction drive unit 50 and the locking device 60 to re-adjust the wheelbase when the separation distance between the passenger's back and the backrest part 23 exceeds a set range.

The load sensor 95 may be installed on the rear body 20 side. The load sensor 95 may detect a weight of the cargo 81 loaded in the cargo loading space 80 and the passenger. The controller 90 may determine whether the weight of the cargo 81 and the passenger is appropriate based on the detection of the load sensor 95 after the user boards, and may control to warn of an excess of load through the alarm 96 when it is determined that a load exceeds the set load or is not appropriate.

Hereinafter, a method of controlling the personal mobility according to an embodiment of the disclosure will be described with reference to the flowchart of FIG. 9.

When the use of personal mobility is authenticated, the controller 90 recognizes the number of users based on detection information of the plurality of user access sensors 93 or information input by the user through the user terminal 110 at 121 and determines whether the number of users exceeds an initial setting at 122.

When it is determined that the number of users has exceeded the initial setting in step 122, the controller 90 controls the extension/contraction drive unit 50 to extend the wheelbase at 123. When it is determined that the number of users has not exceeded the initial setting in step 122, the controller 90 controls the extension/contraction drive unit 50 to maintain the wheelbase in an initial state at 124. The controller 90 controls to release the locking device 60 when the extension/contraction drive unit 50 operates.

Figure 6:
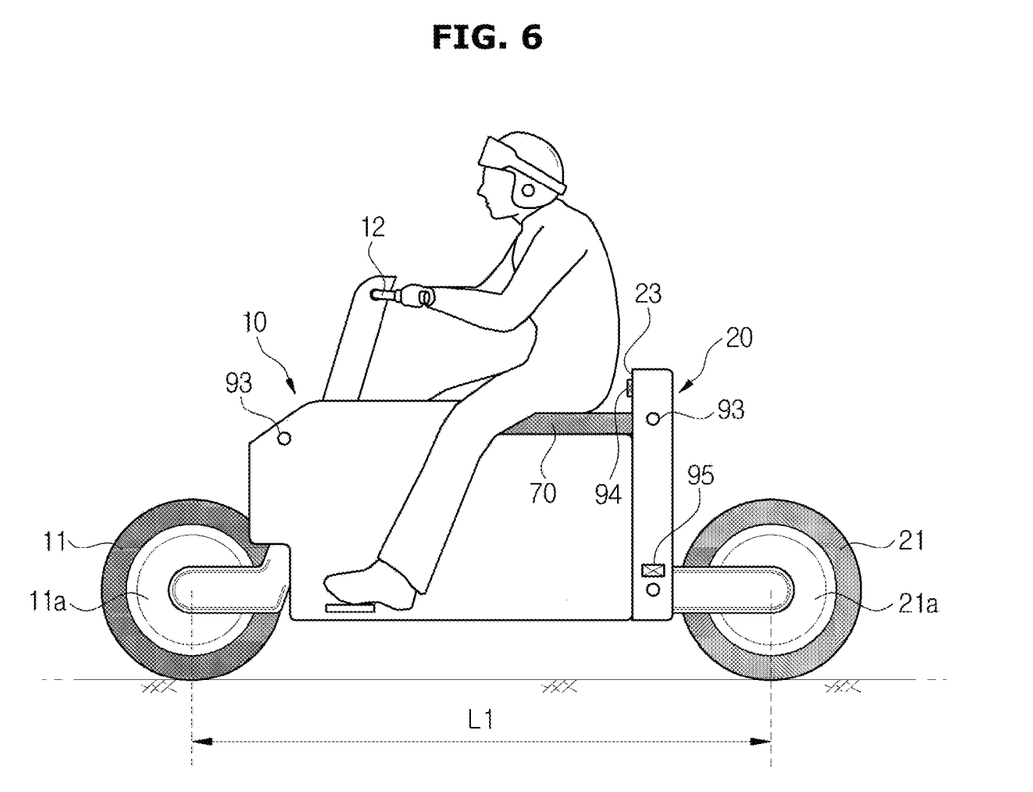
FIG. 6 is a side view of the personal mobility according to an embodiment of the disclosure, which illustrates a state in which a wheelbase is adjusted such that one person boards.
Figure 7:
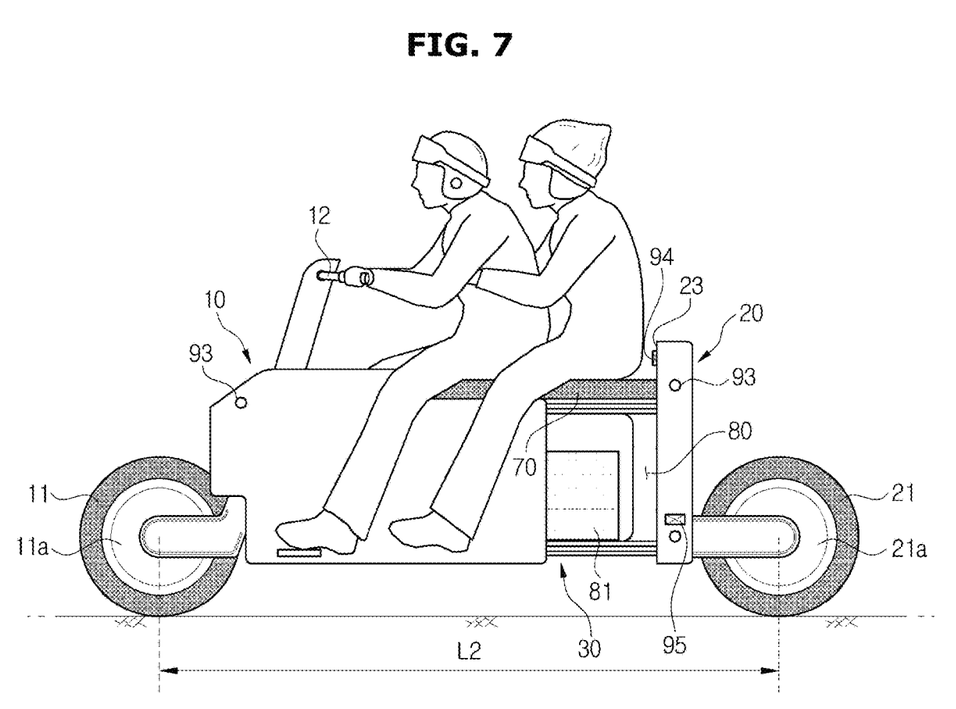
FIG. 7 is a side view of the personal mobility according to an embodiment of the disclosure, which illustrates a state in which the wheelbase is adjusted such that two persons board.

The initial number of users may be one, and as illustrated in FIG. 6, the initial state of the wheelbase may be a state in which the wheelbase is adjusted to a first distance L1 so that one person may board. Therefore, in a state of being parked, the wheelbase may be maintained in the initial state as illustrated in FIG. 6. When it is determined that while the initial number of users is one, two users are approaching the personal mobility, as illustrated in FIG. 7, the controller 90 controls the wheelbase to be adjusted to a second distance L2 for two persons to board. The initial setting of the number of users may be changed to two or more, and the initial state setting of the wheelbase may also be changed to correspond thereto.

The controller 90 controls the wheelbase to be adjusted to correspond to the number of users and then controls the boarding sensor 94 to detect the boarding of the user at 125, and determines whether the user has boarded based on the detection information of the boarding sensor 94 at 126.

When it is determined that the user has boarded in step 126, the controller 90 determines whether the adjusted wheelbase is appropriate by calculating the separation distance between the passenger's back and the boarding sensor 94 at 127. Whether the wheelbase is appropriate may be determined by comparing the separation distance with preset information. When it is determined that the wheelbase is not appropriate in step 127, the controller 90 controls the extension/contraction drive unit 50 to be operated to be operated to re-adjust the wheelbase at 128.

After the user boards, the controller 90 controls the load sensor 95 to detect the weight of the cargo 81 and the passenger at 129 and determines whether the measured load is appropriate at 130. When it is determined that the load is not appropriate (the load exceeds the set value) in step 130, the controller 90 controls to warn of the excess of load through the alarm 96 at 131. When it is determined that the load is appropriate in step 130, the personal mobility is converted to a drivable state.

After step 130, the controller 90 determines whether the personal mobility has started driving at 132 and controls the locking device 60 to lock the sliding connection unit 30 when driving starts at 133. This is to prevent the wheelbase from being changed while driving.

After step 133, the controller 90 determines whether the driving has finished at 134 and controls the operation of the extension/contraction drive unit 50 and the locking device 60 to initialize the wheelbase when the driving is finished at 135.

As described above, the personal mobility according to the present embodiment may easily adjust the wheelbase in response to a change in the number of passengers or the amount of cargo because the front body 10 and the rear body 20 may be slidably connected and the wheelbase may be changed by the operation of the extension/contraction drive unit 50 and the locking device 60. That is, the length of the seat 70 may be changed in response to the number of passengers, or a volume of the cargo loading space 80 may be changed in response to the amount of the cargo 81.

Further, the personal mobility according to the present embodiment may be used conveniently because the wheelbase may be automatically adjusted depending on detection of the user access sensor 93 or information input by the user.

Figure 10:
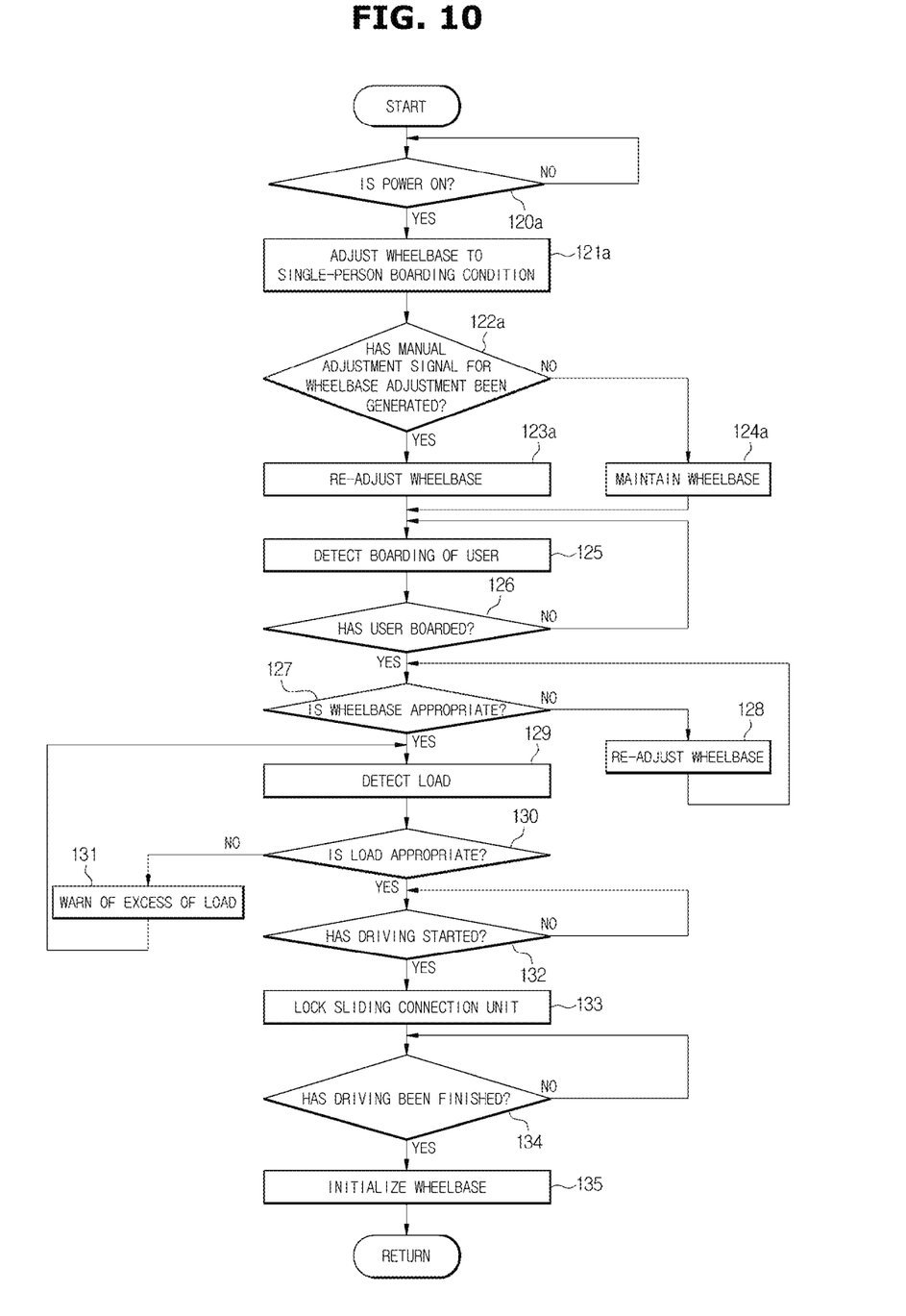
FIGS. 10 and 11 illustrate modified examples of the control method of the personal mobility according to an embodiment of the disclosure.

FIG. 10 illustrates a modified example of the control method of the personal mobility according to an embodiment of the disclosure.

In the control method of FIG. 10, when the use of personal mobility is authenticated, the controller 90 determines whether power of a device is ON at 120*a*. When it is determined that the power is ON in step 120*a*, the controller 90 controls the extension/contraction drive unit 50 to adjust the wheelbase to a single-person boarding condition at 121*a*. In this case, as illustrated in FIG. 6, the wheelbase may be in a state of being adjusted to the first distance L1 so that one person may board.

After the wheelbase is adjusted to the single-person boarding condition, the controller 90 determines whether a manual adjustment signal for wheelbase adjustment has been generated due to manipulation of the operator 92 by the user at 122*a*. This is to allow the user to directly manipulate the operator 92 when necessary in a state in which the wheelbase is adjusted to the single-person boarding condition to adjust the wheelbase to a condition in which two or more person may board.

When it is determined that the manual adjustment signal has been generated in step 122*a*, the controller 90 controls the extension/contraction drive unit at 123*a* to re-adjust the wheelbase in response to the manual adjustment signal. When it is determined that the manual adjustment signal has not been generated in step 122*a*, the controller 90 maintains the wheelbase as it is at 124*a*.

After adjusting the wheelbase, the controller 90 controls the boarding sensor 94 to detect the user's boarding at 125 and determines whether the user has boarded based on the detection information of the boarding sensor 94 at 126.

When it is determined that the user has boarded in step 126, the controller 90 determines whether the adjusted wheelbase is appropriate by calculating the separation distance between the passenger's back and the boarding sensor 94 at 127. Whether the wheelbase is appropriate may be determined by comparing the separation distance with the preset information. When it is determined that the wheelbase is not appropriate in step 127, the controller 90 controls the extension/contraction drive unit 50 to be operated to re-adjust the wheelbase at 128.

Figure 9:
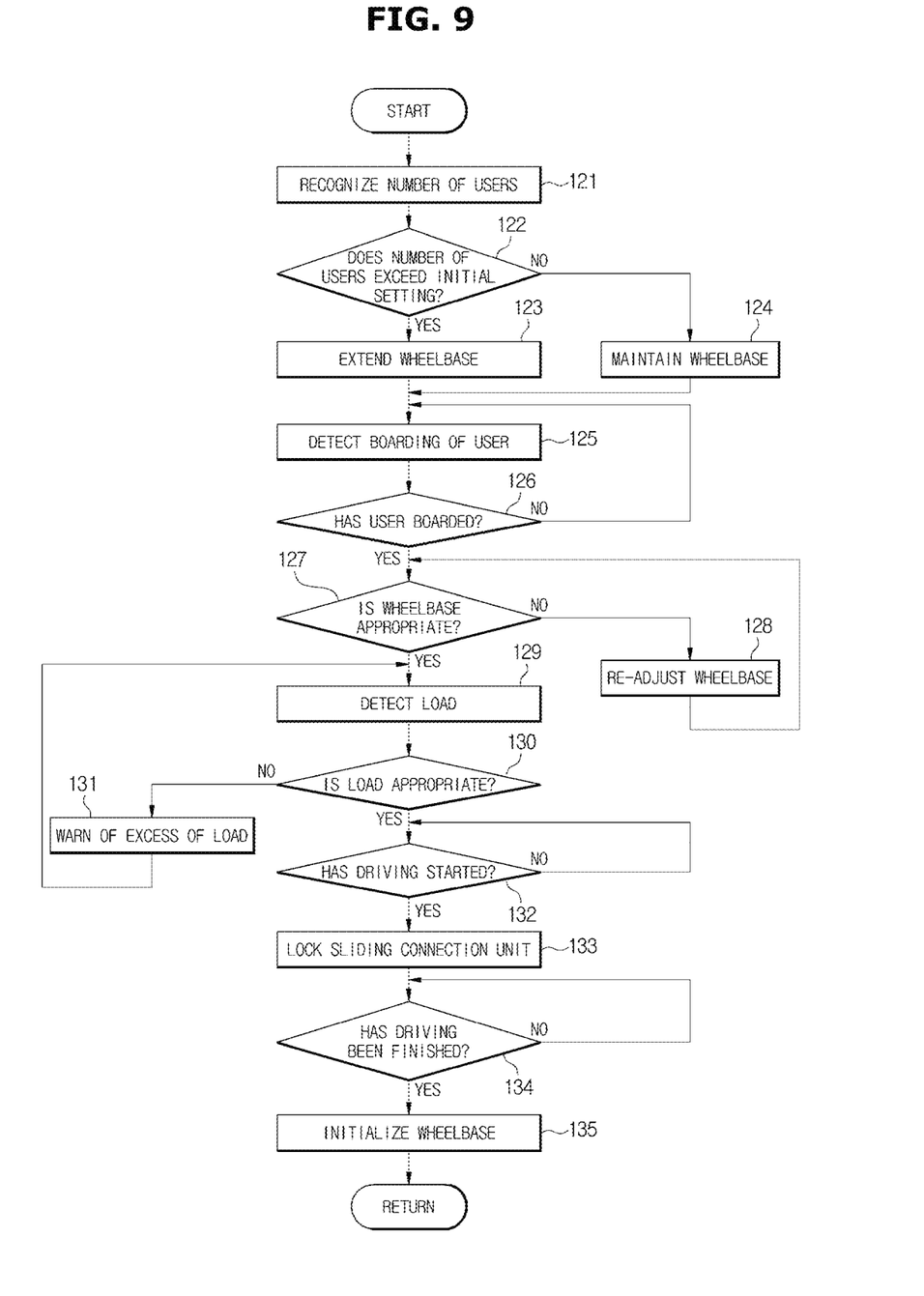
FIG. 9 is a flowchart illustrating a control method of the personal mobility according to an embodiment of the disclosure.

The control method of steps 129 to 135 in the example of FIG. 10 may be substantially the same as that in the example of FIG. 9.

Figure 11:
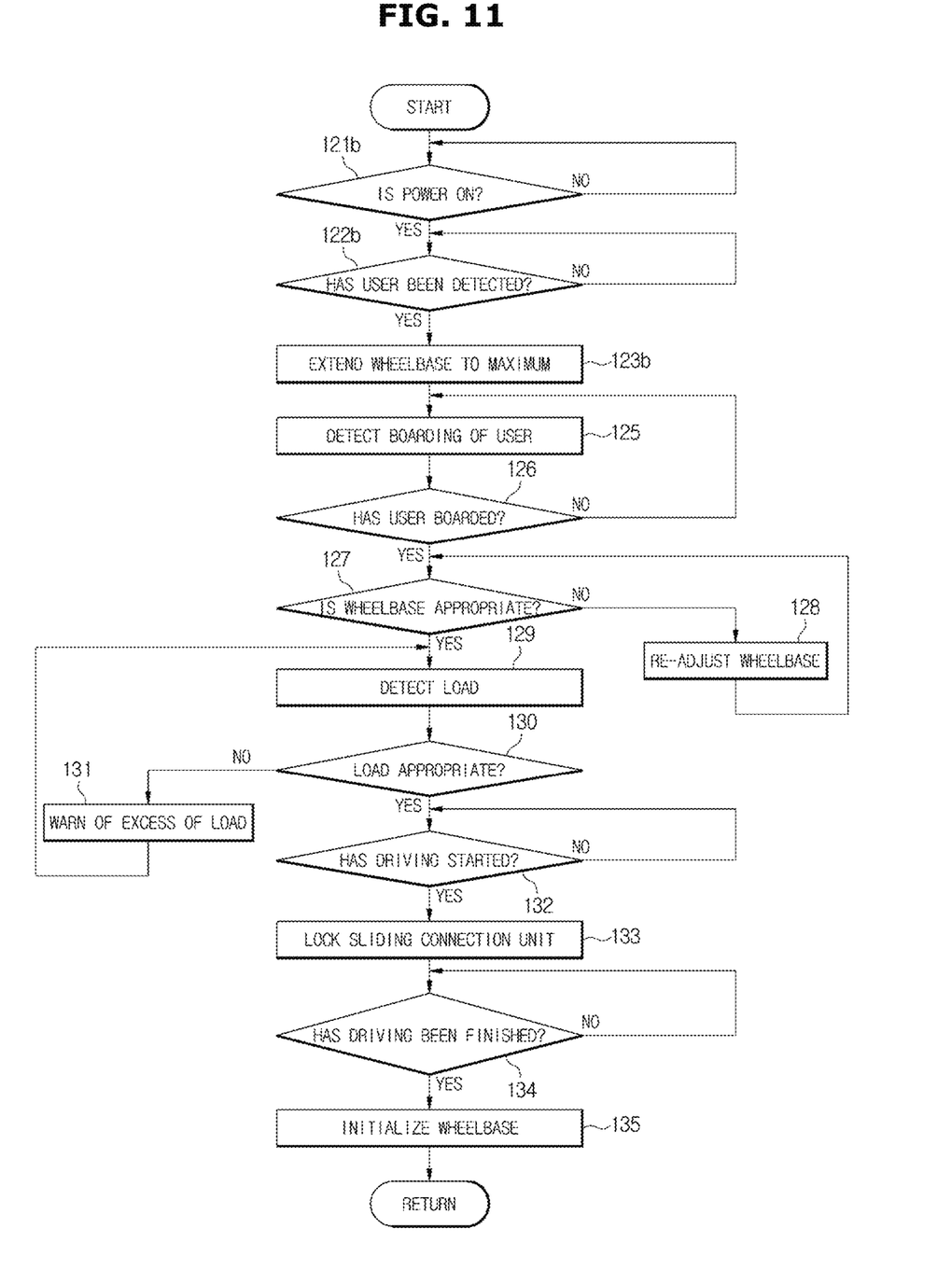

FIG. 11 illustrates another modified example of the control method of the personal mobility according to an embodiment of the disclosure.

In the control method of FIG. 11, when the use of personal mobility is authenticated, the controller 90 determines whether power of a device is ON at 121*b*. When it is determined that the power is ON in step 121*b*, the controller 90 determines whether one or more users are detected by the one or more user access sensors at 122*b*. When it is determined that the one or more users are detected in step 122*b*, the controller 90 controls the extension/contraction drive unit 50 to extend the wheelbase to the maximum at 123*b*.

After the wheelbase is adjusted to extend to the maximum, the controller 90 controls the boarding sensor 94 to detect the user's boarding at 125 and determines whether the user has boarded based on the detection information of the boarding sensor 94 at 126.

When it is determined that the user has boarded in step 126, the controller 90 determines whether the adjusted wheelbase is appropriate by calculating the separation distance between the passenger's back and the boarding sensor 94 at 127. Whether the wheelbase is appropriate may be determined by comparing the separation distance with preset information.

When it is determined that the wheelbase is not appropriate in step 127, the controller 90 controls the extension/ contraction drive unit 50 to be operated to re-adjust the wheelbase at 128. For example, when only one user boards so that the separation distance between the passenger's back and the boarding sensor 94 exceeds the set range, in step 128, the wheelbase may be adjusted to become the single-person boarding condition.

Because the control method of steps 129 to 135 in the example of FIG. 11 may be substantially the same as in the example of FIG. 9, a description thereof will be omitted.

As is apparent from the above, a personal mobility according to an embodiment of the disclosure can easily adjust a wheelbase in response to a change in the number of passengers or the amount of cargo because a front body and a rear body can be slidably connected and the wheelbase can be changed by the operation of an extension/contraction drive unit and a locking device.

Further, the personal mobility according to an embodiment of the disclosure can be used conveniently because the wheelbase can be automatically adjusted depending on detection of a user access sensor or information input by a user.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

The invention claimed is:
1. A personal mobility comprising:
a front body comprising a front wheel;
a rear body slidably coupled to the front body in a front-rear direction to enable wheelbase adjustment, the rear body comprising a rear wheel;
a sliding connection unit configured to connect the front body to the rear body;
a drive unit configured to move the rear body in the front-rear direction to adjust a wheelbase; and
a locking device configured to lock or unlock the sliding connection unit;
wherein the sliding connection unit comprises:
an upper extension part extending forward from an upper side of the rear body and slidably coupled to an upper support rail of the front body; and
a lower extension part extending forward from a lower side of the rear body and slidably coupled to a lower support rail of the front body; and
wherein the drive unit comprises:
a rack gear mounted on the upper extension part to extend in a longitudinal direction of the upper extension part;
a pinion gear engaged with the rack gear; and
a driving motor fixed to the front body to rotate the pinion gear in a forward direction and a reverse direction.

2. The personal mobility according to claim 1, wherein the locking device comprises:
a plurality of locking holes provided on the upper extension part and spaced apart from each other in a longitudinal direction of the upper extension part;
a locking pin capable of locking the upper extension part by entering one of the plurality of locking holes; and
an actuator configured to advance or retreat the locking pin in a locking or unlocking direction.

3. The personal mobility according to claim 1, further comprising:
a seat provided above the upper extension part configured to extend in the front-rear direction;
a cargo loading space provided between the upper extension part and the lower extension part; and
a load sensor installed on the rear body to detect the weight of cargo and a passenger.

4. The personal mobility according to claim 1, further comprising:
a plurality of user access sensors configured to detect the number of users accessing the personal mobility;
a boarding sensor installed on the rear body to detect whether or not a passenger boards and a separation distance between the passenger's back and a rear upper side of the rear body; and
a controller configured to control the operation of the drive unit and the locking device based on the detection information of the plurality of user access sensors or the boarding sensor.

* * * * *